UNITED STATES PATENT OFFICE.

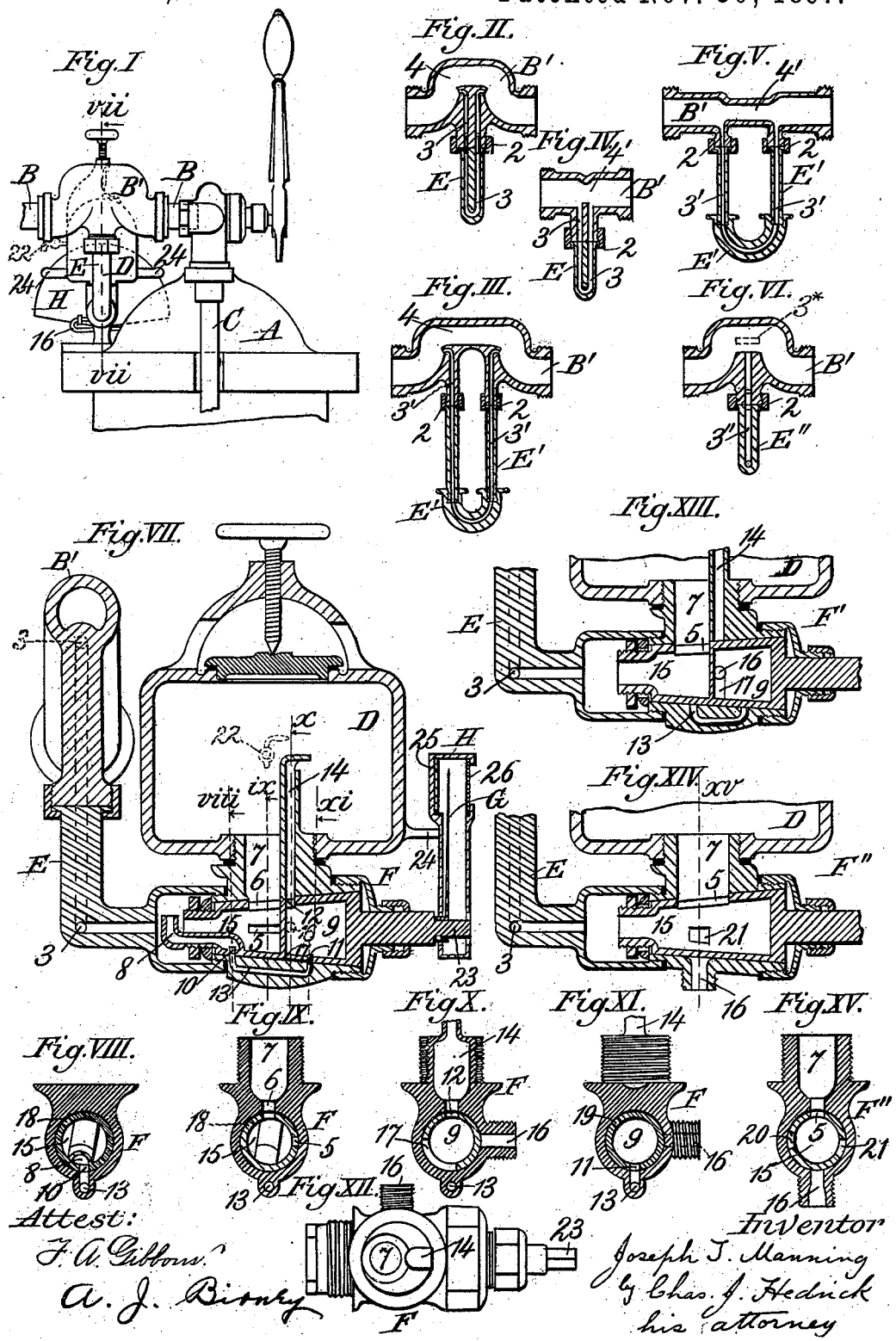

JOSEPH T. MANNING, OF PHILADELPHIA, PENNSYLVANIA, ASSIGNOR TO THE LOOMIS-MANNING FILTER COMPANY, OF SAME PLACE.

COAGULANT-FEEDER FOR WATER PURIFICATION.

SPECIFICATION forming part of Letters Patent No. 594,638, dated November 30, 1897.

Application filed October 15, 1895. Serial No. 565,760. (No model.)

*To all whom it may concern:*

Be it known that I, JOSEPH T. MANNING, a citizen of the United States, residing at Philadelphia, in the county of Philadelphia and State of Pennsylvania, have invented certain new and useful Improvements in Feeding Coagulants to Filters; and I do declare the following to be a full, clear, and exact description of the invention.

This invention relates more particularly to the supply of coagulating material to a current of water on its way to a filter or other purifying-chamber in which it is freed from foreign matter by settling or filtration or the like; but each of the improvements constituting the said invention is intended to be secured for all the uses to which it may be adapted.

In feeding coagulant to a stream of water from a closed coagulant-chamber I consider it desirable to feed the solution from the bottom rather than the top of the liquid in the chamber; but when the bottom of the coagulant-chamber is connected directly with the fresh-water-supply pipe the coagulant solution during periods of rest tends to diffuse itself (by reason of the greater specific gravity of the solution) through all the water in said pipe which is below the coagulant-chamber. It also tends to diffuse itself, much more gradually, however, upward through the water in said pipe which may be above the outlet at the bottom of the coagulant-chamber. Consequently if the supply-pipe be bent into a U-shaped trap at the coagulant-chamber to retain the coagulant when the water is turned off there is a considerable body of water to become strongly charged (or even saturated) with coagulant, so that there is not only loss of coagulant, but the first water which comes through is seriously overdosed with coagulant. In some cases two small vertical conduits have been interposed between the coagulant-chamber and a higher part of the fresh-water-supply pipe. In these cases the difficulty of overdosing when the current is temporarily stopped is not encountered; but inasmuch as in such cases the coagulant-conveying conduit receives only the saturated solution of the coagulant the flow in it must be very slow (only a very little coagulant being ordinarily required) and the conduit is very apt to become clogged by the crystallization of the coagulant therein.

In accordance with the present invention I employ a coagulant-conveying conduit which rises to its connection with the fresh-water-supply pipe and is of a proper length to form a coagulant-trap, and I also provide means for causing fresh water to enter said trap-conduit, which therefore does not receive merely a saturated coagulant solution. This trap-conduit is distinct from the fresh-water-supply pipe, of which it forms a branch, and may be of much smaller cross-section than the bore of the supplying-pipe, so that although the water in the trap-conduit may become strongly charged with coagulant during a period of repose it mixes with other water on the resumption of flow and is thus diluted. On the other hand, the entry of fresh water into the trap-conduit diminishes the strength of the solution, thereby lessening the danger of crystallization and enabling a conduit of greater diameter to be used than if a saturated solution were to be fed normally.

The means for causing fresh water to enter the coagulant-conveying trap-conduit may be of various forms. Three principal forms, any of which may be used separately or in combination with either or both the others, will be described. They are, first, a construction whereby a body of air is confined in a space behind the trap-conduit, (and most advantageously within the closed coagulant-chamber;) second, a continuation of the trap-conduit from a point in proximity to the coagulant-chamber back to the fresh-water-supply pipe, the trap-conduit thus being of a U or other forked shape, (as a V or Y,) with its upper ends connected with the fresh-water-supply pipe and its lower end in communication with the closed coagulant-chamber, and, third, a draw-off conduit for putting the lower end of the trap-conduit in communication with a waste-outlet. With the first form the action is automatic, and the fresh water enters at the discharge end of the trap-conduit on a rise of pressure in the supply-pipe. This pressure in most cases fluctuates, (as from the turning of spigots on and off and other causes,) and as the volume of air in the confined air-space varies inversely as the pressure, water is moved automatically in and out of the trap-conduit. With the second form the action is also automatic, the water from the supply-pipe entering the trap-conduit at the latter's receiving end and passing again into the supply-pipe at its exit end so long as the current in the supply-pipe is flowing. While going through the trap-conduit the water receives the charge of coagulant. Owing to this continuity of action while the supply-current is flowing, this U-shaped or forked conduit is much more advantageous than a direct or simple trap-conduit, which may, however, be used with the first or third or other suitable means for causing fresh water to enter it.

The draw-off conduit is not intended to be automatic in its action, but to be opened by the attendant when thought necessary or desirable. Practically, since each has advantages peculiar to itself, it is preferred to combine the means for confining air in a space behind the trap-conduit, the trap-conduit of U or other forked shape, and the draw-off conduit at the lower end of the trap-conduit in the same coagulant-feeder, although, as before indicated, it is not essential to the use of one that it should be combined with the others.

In order that the delivery of the coagulant may be regulated somewhat by the rate of flow of the water to be purified and also that a better mixing of the coagulant with the main current may be effected, the trap-conduit is made to terminate in an opening which is turned like an ejector-nozzle in the direction toward which the main current flows. To make this action the greater, the supply-pipe may be contracted just before the trap-conduit opens into it. In the case of the U-shaped or forked conduit it is the exit end which is arranged like an ejector-nozzle, and the contracted part of the supply-pipe is most advantageously placed between the fresh-water-receiving and the exit ends of said conduit. The discharge-opening turned like an ejector-nozzle (with or without the contraction of the main-pipe bore just before said opening) may be applied also to a coagulant-delivering conduit, which may not be of such length and arrangement as to constitute a coagulant-trap. Such conduit may be connected at one end or at both ends with the fresh-water-supply pipe, and if connected therewith at both ends need not be a vertical U-shaped or forked conduit, (although it may be;) but it may be of other forms, one example of which would be a straight or curved horizontal conduit. This part of the invention therefore extends in general to coagulant-conveying conduits connected at one or two ends with the fresh-water pipe, as well as in particular to coagulant-conveying trap-conduits.

The invention also includes the constructions, improvements, and combinations hereinafter particularly pointed out.

In the accompanying drawings, which form part of this specification, Figure I is an elevation of a coagulant chamber and trap in accordance with the present invention, showing the same in connection with the upper portion of a filter. Fig. II is a vertical section of the U-shaped or forked coagulant-trap on a plane parallel with that of Fig. I. Figs. III, IV, and V are views in vertical section of modifications of the U-shaped or forked coagulant-trap. Fig. VI is a similar view of the direct or simple trap. Fig. VII is a sectional view, on an enlarged scale, of the coagulant chamber and trap, the section being on line $vii$ of Fig. I. Figs. VIII, IX, X, and XI are views of the valve of Fig. VII in cross-section, respectively, on lines $viii$, $ix$, $x$, and $xi$ of said figure. Fig. XII is a plan of said valve detached. Figs. XIII and XIV are views similar to the lower part of Fig. VII, showing simpler forms of valve; and Fig. XV is a cross-section of the valve of Fig. XIV on line $xv$ of such figure.

Referring to Fig. I, the filter A may have an arrangement of valves and pipe connections, such as shown in Patent No. 542,755, issued to B. T. Loomis May 25, 1886, which enables the water from the supply-pipe B to pass downward through the filter A and upward by the pipe C, and so to the place of consumption, (in order to furnish a supply of filtered water,) or to pass downward through the pipe C and then upward through the filter A and so to waste, (in order to wash the filtering material,) or the said filter may have any suitable arrangement of valves and pipe connections, or the pipe B might be arranged to deliver the water to a settling-basin instead of a filter.

The coagulant-chamber D is shown as mounted on the filter; but it might be supported in any suitable way.

The coagulant-trap is shown as formed partly by a section B' of the supply-pipe and partly by an attachment (E in Figs. I, II, IV, VII, XIII, and XIV, E' in Figs. III and V, and E'' in Fig. VI) secured to said section B' by one or two unions 2, and the said section B' is shown in Figs. I, II, III, and VI as formed of an inverted-U shape; but while each of these features is regarded as advantageous and as constituting a special improvement, neither of them is essential to the main inventions. Essentially the coagulant-trap is formed of a vertical (or inclined) conduit rising from the coagulant-chamber D to the supply-pipe B and being of a suitable height to prevent the coagulant working over into the said pipe B when the water is at rest. As shown, the top of the conduit is above the top of the coagulant-chamber, and this is considered the best arrangement.

The conduit may be U-shaped, with its ends at points of different pressure, as shown at 3 in Figs. II and IV, or at 3' in Figs. III and V, or direct simply, as shown at 3″ in Fig. VI. These forms are given by way of example merely and not to restrict the invention to them. Other variations could be made. While both the U-shaped and the direct conduits are considered useful, the former is the more advantageous, because the flow of water through it whenever the water is running makes the delivery more uniform and diminishes the liability of the conduit to become clogged. It is also advantageous to have the exit end of the conduit—that is to say, the end through which the solution of coagulant escapes into the main supply-pipe B—turned downstream, as shown for the U-shaped conduits in Figs. II and III, after the manner of an ejector-nozzle, in order that the flow of the main current may tend to exhaust the water from the conduit and to mix more thoroughly the solution from the conduit with the main current in the supply-pipe B. In the case of the single conduit the action would be limited to the flow in and out of the coagulant-chamber; but with the U-shaped conduit it may be exerted also on the current which is deflected from the main current to pass as a parallel stream through the conduit. A current could be deflected across the exit end of the single-trap conduit by having a partition across the supply-pipe, as indicated in dotted lines at 3* in Fig. VI. This arrangement (as well as the arrangement of Figs. II to V) gives, it will be observed, a coagulant-conveying trap-conduit (although not a U-shaped or forked conduit) connected at two ends with the fresh-water-supply pipe and at an intermediate point with the coagulant-chamber.

In connection with the arrangement of the delivery end of the trap-conduit, like an ejector-nozzle, a contraction in the bore of the supply-pipe is useful (as at 4 or above the dotted partition 3*) just before the trap-conduit opens into it. A contraction is useful, (especially between the entrance and exit ends of a conduit connected with the supply-pipe at two ends,) although the exit end be not turned like an ejector-nozzle downstream, and is shown at 4′ in Figs. IV and V.

The communication between the lower part of the coagulant-chamber D and the lower end of the trap-conduits 3, 3′, or 3″ is made, preferably, through the valve (marked F in Fig. VII, F′ in Fig. XIII, and F″ in Fig. XIV) by which the delivery of the coagulant is regulated. In Fig. VII the valve-key has two coagulant-ports 5 and 6. When in the position shown, the port 6 registers with the feed port or passage 7 in the valve-case, which port or passage, in connection with the passage 15, forms the outlet from the coagulant-chamber into the trap-conduit, and the passages 8 and 9 in the valve-key are in communication, through the key-ports 10, 11, and 12, with the conduits 13 and 14 of the casing, the conduit 14 extending upward into the coagulant-chamber. The solution of alum or of other coagulant in chamber D below the top of conduit 14 being specifically heavier than the fresh or less impregnated water in the said conduit, a circulation is formed from the lower part of the trap-conduit through passages 8, 13, 9, and 14 into the coagulant-chamber, where said water becomes saturated with the coagulant by dissolving more of the solid alum in the said chamber, and thence back to the trap-conduit through the passage 7, port 6, and passage 15 in the valve-key. The passage 8 could be omitted, the port 10 opening into passage 15. The circulation would proceed (with or without the passage 8) even if the chamber D were full of liquid. It is desirable, however, to have a body of air confined in the upper part of the chamber, so that there may be a flow into and out of said chamber through the alternate compression and expansion of the confined air. Thus when the pressure in pipe B is lowered (as by turning on the water in the house or otherwise) the compressed air in chamber D feeds coagulant out. When the pressure in pipe B rises, water forces itself into the coagulant-chamber by one or both of the ways provided. When the valve F is turned to make the port 5 register with the passage 7, the circulation-conduit 8 13 9 14 is closed and the coagulant is fed into the lower part of the trap-conduit by diffusion and by the flow in and out which is induced by the variations of pressure in the pipe B. The coagulant in the arrangements of Figs. XIII, XIV, and XV is fed in this way—that is, by diffusion and regurgitation—through the passage 15 7 and port 5.

Each of the valves shown is provided with a fresh-water-draw-off conduit for allowing the water from the pipe B to run away through the trap-conduit (of whatever form) which may be used with the particular valve. In Fig. VII there is a waste-conduit 16, terminating opposite the passage 9 in the key, and when the key-port 17, Fig. X, registers with the end of said waste-conduit and the key-ports 18 and 19 at the same time register with the ends of conduit 13 the water from the pipe B runs away through the trap-conduit by way of the valved fresh-water-draw-off conduit, composed of conduits 13 and 16, with their key-ports 18, 19, and 17. In Fig. XIII the same arrangement of ports and conduit is used for drawing off the water through the trap-conduit, only the conduit 13 is shown as terminating directly opposite the feed-conduit 7, the port 18 being so placed as to register with it when the key is in proper position. In the valve of Figs. XIV and XV there is one fresh-water-draw-off port 21, and this is in the main portion of the valve, the waste-conduit being marked 16, as before. In all the figures the feed-ports are shown as arranged in such a way that the communication with the coagulant-chamber can be shut off when the fresh-water-draw-off conduit is open. Fresh water can therefore be run away, when desired, through the branch trap-conduit without altering the contents of the coagulant-chamber. Instead of or in addition to this arrangement ports could be provided for establishing communications with the coagulant-chamber while the fresh-water-draw-off conduit is open. Such arrangement is exhibited in Figs. XIV and XV and will presently be more fully explained.

To utilize the momentum of the stream which flows past the feed-passage 7 for the purpose of clearing the same, the stream is suddenly arrested in proximity to said passage and the feed-port 5 (or in Fig. VII one of the feed-ports 5 and 6) opened. This can be done with any of the valves shown by turning their respective keys suddenly from the draw-off to a feeding position, so that the feed-ports are open when the blow of the water-hammer is exerted. The feed-ports may be opened simultaneously with or instantly after the draw-off conduit is closed. The feed-port (or a substitute port) could be arranged to be open before the closure of the draw-off port or ports. Thus with the valve of Figs. XIV and XV by turning the key to the right the key-port 20 can be brought opposite the feed-passage 7 before the draw-off conduit is closed, and it can be allowed to remain open after the draw-off conduit has been closed by a further movement to the right. A quick movement would close the draw-off conduit before the contents of the chamber D could run off. The port 20 could be used as the feed-port instead of the port 5, if desired. The effect of the water-hammer could be obtained in the same way if the trap-conduit were not used—as, for example, if the valves were connected more directly with the pipe B than through a trap-conduit.

In the valves shown means are also provided for relieving the pressure in the coagulant-chamber and evacuating more or less of its contents at the will of the attendant. To this end the key-port 17, Fig. X or XIII, is arranged to register with the lower end of the conduit 14 when the key is turned to proper position, the coagulant-feed passage 7 and the fresh-water conduit 13 being closed when the key is in this position and the passage 9 being then in communication with the waste-conduit 16 through the port 17. By putting the key of valve F or F', therefore, in proper position the pressure in the coagulant-chamber will be relieved, a part of its contents passing to waste through the conduit 14 9 16. After this has been done the key can be turned to close the communication with conduit 16 and open the communication between the coagulant-chamber and the pipe B, such communication being established through the passage 7 or the passages 7 and 13 9 14 of Fig. VII.

As the pressure of the water in the pipe B exceeds that which obtains in the chamber D after running part of its fluid contents to waste, the excess of pressure tends to force the water into the chamber D through the feed-passage 7 or the passages 7 and 13 9 14 of Fig. VII, thus clearing such passage or passages. To increase the clearing effect, the blow of the water-hammer can be applied while the low pressure obtains within the chamber D. To effect this, after the contents of the chamber D have been partially drawn off, as before explained, the port 17 is removed from under the conduit 14 and the fresh water from pipe B is allowed to run to waste through the conduit 13 9 16, and when the stream is flowing rapidly this conduit to waste is suddenly closed by valve F or F' and the passage 7 or (with valve F) the passages 7 and 13 9 14 opened. To accomplish this with the valve of Figs. XIV and XI, the key is turned to the right, Fig. XV, until the draw-off port 21 is made to register with the waste-conduit 16. Then it is turned still farther to the right until the port 20 opens the passage 7 (now serving as a coagulant-waste passage) as much or as little as may be desired. As the opening of the waste-conduit 16 will have lowered the pressure in the valve F''', the fluid contents of the coagulant-chamber D will flow away to waste. A still farther turning of the key to the right will close the conduit 16, leaving the passage 7 open to receive the water from the stream, which has been flowing under the high pressure in the pipe B and has been suddenly arrested in proximity to said passage while a low pressure obtains in the chamber D. Instead of continuing the turning of the key to the right after the fluid contents of the chamber D have been wholly or partially drawn off it could be turned quickly to the left, so as to close the conduit 16 (by withdrawing the port 21) and to open the passage 7 through the port 5. The pressure in the coagulant-chamber could also be relieved and more or less of its fluid contents drawn off by a cock, as shown at 22 in Figs. I and VII in dotted lines, or other draw-off independent of the key or valve which controls the feed port or conduit or the fresh-water draw-off, or both, although it is more advantageous to combine all in one valve or key, as illustrated by the valve F or F' or F''.

In order to prevent unauthorized persons from disturbing the coagulant-valve, the pointer or index G or the stem of the valve-key is inclosed in a case H, so as to be inaccessible, and the said stem is arranged to require the use of a special device or key before it can be turned. This may be done by merely squaring the end, as at 23; but it is better to have the squared end inclosed within the case H and exposed only at the end, as shown in Fig. VII. It could also be effected by having the stem or the means for turning it wholly inclosed and accessible only through a locked door, a key or keys being required to open the door or to turn the valve-stem, or for both purposes. The case H is shown as upheld by the projections 24 on the coagulant-chamber. The graduations or arc 25 is seen through the glass 26.

In the hereinafter-written claims it will be understood that in claiming a port or passage it is not intended to exclude the use of more than one port or passage, or of a port and passage, or of ports and passages, and other like expressions are to be similarly construed.

In my application for patent, Serial No. 493,563, filed December 13, 1893, for improvements in filters, I have described a self-cleaning granular-bed filter with coagulant-supply in which there is, among other things, a closed coagulant-chamber connected with the fresh-water-supply pipe of the filter and also with a waste-conduit through the intermediary of a valve having in its key and casing the arrangements of ports and passages (including conduits 13 and 14) shown in Figs. VII to XII, inclusive, of the drawings of the present application and hereinabove described with reference to said figures, the valve-casing, as shown in my said application of December 13, 1893, being screwed into a socket on the side of the supply-pipe at the bottom of a U-shaped bend in said pipe and opening directly into said pipe, and the valve-key, as shown in my said application of December 13, 1893, being without the means hereinabove set forth for preventing disturbance by unauthorized persons of the coagulant-valve.

I have claimed in my said application of December 13, 1893, matters of invention which are embodied as well in apparatus therein shown or described as in apparatus shown or described in my present application.

I claim as my invention or discovery—

1. A coagulant-feeder composed of a closed coagulant-chamber, and a coagulant-conveying conduit connected with said chamber and rising to the junction of said conduit with the fresh-water-supply pipe, to form a trap against the transfer of the coagulant to the said pipe while the water therein is at rest, said feeder being also provided with means as specified for letting water into said conduit without emptying the said chamber of liquid, substantially as described.

2. A coagulant-feeder composed of a closed coagulant-chamber, and a coagulant-conveying conduit connected with said chamber and rising to the junction of said conduit with the fresh-water-supply pipe, to form a trap against the transfer of the coagulant to the said pipe while the water therein is at rest, said feeder being also provided with means as specified for letting water into said conduit automatically, that is to say by differences of pressure in the said supply-pipe, substantially as described.

3. A coagulant-feeder composed of a closed coagulant-chamber, a coagulant-conveying conduit connected with said chamber and rising to the junction of said conduit with the fresh-water-supply pipe, and a valve arranged at the bottom of said chamber between it and said conduit, substantially as described.

4. A coagulant-feeder composed of a closed coagulant-chamber, and a coagulant-conveying conduit of U or forked shape, which is connected with said chamber, which has its branches in communication with each other outside of said chamber, and which rises to the junction of both its said branches with the fresh-water-supply pipe to form a trap against the transfer of the coagulant to the said supply-pipe while the water is at rest therein, substantially as described.

5. A coagulant-feeder composed of a closed coagulant-chamber, a coagulant-conveying conduit of U or forked shape which is connected with said chamber, which has its branches in communication with each other outside of said chamber, and which rises to the junction of both its said branches with the fresh-water-supply pipe to form a trap against the transfer of the coagulant to the said supply-pipe while the water is at rest therein, and a valve arranged at the bottom of said chamber between it and said conduit, substantially as described.

6. A coagulant-feeder composed of a coagulant-conveying conduit rising to its junction with the fresh-water-supply pipe, to form a trap against the transfer of the coagulant to said pipe while the water is at rest therein, and means for holding in spaces back of said conduit and in communication therewith, a supply of coagulant and a body of confined air, substantially as described.

7. A coagulant-feeder composed of a coagulant-conveying conduit of U or forked shape which rises to the junction of both its branches with the fresh-water-supply pipe, to form a trap against the transfer of the coagulant to said pipe while the water is at rest therein, and means for holding in spaces back of said conduit and in communication therewith, a supply of coagulant and a body of confined air, substantially as described.

8. A coagulant-feeder composed of a closed coagulant-chamber, and a coagulant-conveying conduit which is connected at two ends with the fresh-water-supply pipe and at an intermediate point with the said chamber, the said conduit being continuous outside of said chamber between its two junctions with said supply-pipe, substantially as described.

9. A coagulant-feeder composed of a closed coagulant-chamber, and a coagulant-conveying conduit which is connected at two ends with the fresh-water-supply pipe and at an intermediate point with the said chamber, the said conduit being continuous outside of said chamber between its two junctions with said supply-pipe, and the bore of the latter being contracted between said junctions, substantially as described.

10. A coagulant-feeder composed of a closed coagulant-chamber, and a coagulant-conveying conduit which is connected at two ends with the fresh-water-supply pipe and at an intermediate point with said chamber and which rises to its two junctions with the supply-pipe, thereby forming a trap against the transfer of the coagulant to said supply-pipe while the water is at rest therein, the said conduit being continuous outside of said chamber between its said junctions with the supply-pipe, substantially as described.

11. A coagulant-feeder composed of a closed coagulant-chamber, and a coagulant-conveying conduit which is connected at two ends with the fresh-water-supply pipe and at an intermediate point with said chamber and which rises to its two junctions with the supply-pipe, thereby forming a trap against the transfer of the coagulant to said supply-pipe while the water is at rest therein, the said conduit being continuous outside of said chamber between its said junctions with the supply-pipe, and the bore of said supply-pipe being contracted between said junctions, substantially as described.

12. A coagulant-feeder composed of a closed coagulant-chamber, and a coagulant-conveying conduit, which is connected at two ends with the fresh-water-supply pipe and at an intermediate point with the said chamber, the said conduit being continuous outside of said chamber between its two junctions with said supply-pipe, and the end at which coagulant is delivered into said supply-pipe being turned in the direction of the pipe's axis like an ejector-nozzle, substantially as described.

13. A coagulant-feeder composed of a closed coagulant-chamber, and a coagulant-conveying conduit which is connected at two ends with the fresh-water-supply pipe and at an intermediate point with the said chamber, the said conduit being continuous outside of said chamber between its two junctions with said supply-pipe, and the end at which coagulant is delivered into said supply-pipe being turned in the direction of the pipe's axis like an ejector-nozzle, in combination with a supply-pipe having its bore contracted between said junctions, substantially as described.

14. A chambered coagulant-feeder adapted to act as a reservoir for coagulant and as an air-reservoir, and provided with a coagulant-conveying conduit having the end thereof at which coagulant is delivered into the supply-pipe turned in the direction of the pipe's axis like an ejector-nozzle, substantially as described.

15. In combination with a fresh-water-supply pipe, a closed coagulant-chamber, and a coagulant-conveying conduit connected with said chamber and said supply-pipe and having the end at which coagulant is delivered into said supply-pipe formed in the wall of said pipe and there turned in the direction of the pipe's axis like an ejector-nozzle, substantially as described.

16. A coagulant-feeder composed of a closed coagulant-chamber, and a coagulant-conveying conduit of U or forked shape which rises to the junction of both its branches with said supply-pipe and which has the end at which the coagulant is delivered turned in the direction of the pipe's axis like an ejector-nozzle, said conduit being continuous outside said chamber and connected therewith at a point between its junctions with the supply-pipe, substantially as described.

17. A coagulant-feeder composed of a coagulant-chamber, a coagulant-conveying conduit connected with said chamber and rising to its junction with the fresh-water-supply pipe to form a trap against the transfer of the coagulant to said supply-pipe while the water is at rest therein, and a valved draw-off conduit connected outside said chamber with the said coagulant-conveying conduit, substantially as described.

18. A coagulant-feeder composed of a coagulant-chamber, a coagulant-conveying conduit of U or forked shape, which is connected with said chamber, which has its branches in communication with each other outside said chamber, and which rises to the junction of both its said branches with the fresh-water-supply pipe to form a trap against the transfer of the coagulant to said supply-pipe while the water is at rest therein, and a valved draw-off conduit connected outside said chamber with the said coagulant-conveying conduit, substantially as described.

19. A coagulant-feeder composed of a coagulant-chamber, a coagulant-conveying conduit connected with said chamber and rising to its junction with the fresh-water-supply pipe to form a trap against the transfer of the coagulant to said supply-pipe while the water is at rest therein, a valve arranged at the bottom of said chamber between it and the said coagulant-conveying conduit, and a valved draw-off conduit connected outside said chamber with the said coagulant-conveying conduit, substantially as described.

20. A coagulant-feeder composed of a coagulant-chamber, a coagulant-conveying conduit connected with said chamber and rising to its junction with the fresh-water-supply pipe to form a trap against the transfer of the coagulant to said supply-pipe while the water is at rest therein, and a valved draw-off conduit connected with said chamber, substantially as described.

21. A coagulant-feeder composed of a coagulant-chamber, a coagulant-conveying conduit connected with said chamber and rising to its junction with the fresh-water-supply pipe to form a trap against the transfer of the coagulant to said supply-pipe while the water is at rest therein, a valve arranged at the bottom of said chamber between it and the said coagulant-conveying conduit, a valved draw-off conduit connected with said chamber, and a valved draw-off conduit connected outside said chamber with the said coagulant-conveying conduit, substantially as described.

22. The combination of a fresh-water-supply-pipe section having the wall on the under side thereof very thick and a passage therein to form part of a coagulant-conveying conduit, an attachment having a passage therein to form another portion of said conduit and coupled to said pipe with its portion of said conduit in line with the portion in the wall of the pipe-section, and a closed coagulant-chamber having its interior connected with the portion of the conduit formed by said attachment, substantially as described.

23. The combination with a closed coagulant-chamber, of a fresh-water-supply pipe having an inverted-U-shaped bend, and a coagulant-conveying conduit connected with the bottom of said chamber and the high part of said inverted-U bend and rising to its junction with said bend to form a trap against the transfer of the coagulant into said supply-pipe when it is at rest therein, substantially as described.

24. The combination with a supply-pipe, and a coagulant-chamber, of a U or forked shaped coagulant-conveying conduit, which is connected with said chamber, which has its branches in communication with each other outside of said chamber, which rises to the junction of both its said branches with said supply-pipe, and which has the upper ends of said branches faced in opposite directions, substantially as described.

25. A valve provided with an index and a case inclosing the index to prevent access thereto and having the valve-key with the end squared or inclosed or both squared and inclosed so as to require the use of a special device or key for turning the same, substantially as described.

26. The combination with the coagulant-chamber, and the coagulant-conveying conduit, of a valve for said conduit provided with an index and a case inclosing the index to prevent access thereto, said valve having the end squared or inclosed or both squared and inclosed so as to require the use of a special device or key for turning the same, substantially as described.

In testimony whereof I affix my signature in presence of two witnesses.

JOSEPH T. MANNING.

Witnesses:
GEO. W. CLEMENT,
ROBT. A. LINTON.